United States Patent [19]
Van Gaasbeek et al.

[11] 3,799,628
[45] Mar. 26, 1974

[54] HYDROSTATIC BUTTON BEARING WITH ATTITUDE CONTROL

[75] Inventors: Peter Hakkenberg Van Gaasbeek, Dunlap; Theodore J. Hebner, Pekin, both of Ill.

[73] Assignee: Caterpillar Tractor Co., Peoria, Ill.

[22] Filed: June 21, 1972

[21] Appl. No.: 264,962

[52] U.S. Cl. .................... 308/5 R, 308/9, 308/122
[51] Int. Cl. ........................................... F16c 17/00
[58] Field of Search ........................ 308/5, 9, 122

[56] References Cited
UNITED STATES PATENTS

| | | | |
|---|---|---|---|
| 3,635,126 | 1/1972 | Engel | 92/57 |
| 3,711,167 | 1/1973 | Ennis | 308/9 |
| 3,545,366 | 12/1970 | Bruhin | 308/5 R |
| 3,658,393 | 4/1972 | Luthi | 308/5 R |

FOREIGN PATENTS OR APPLICATIONS

| | | | |
|---|---|---|---|
| 1,201,124 | 8/1970 | Great Britain | 308/5 |
| 1,203,585 | 8/1970 | Great Britain | 308/9 |

*Primary Examiner*—Charles J. Myhre
*Assistant Examiner*—R. H. Lazarus
*Attorney, Agent, or Firm*—Fryer, Tjensvold, Phillips & Lempio

[57] ABSTRACT

A circular hydrostatic button bearing which is supported by its skirt loosely received in associated pressurized pocket, achieves attitude stability by a chamfered circular edge on a substantially flat bearing pad area having several sills that oppose the thrust forces induced by a runner surface that is supported by the button bearing. The inner sill has a configuration to achieve a proper geometric balance.

4 Claims, 2 Drawing Figures

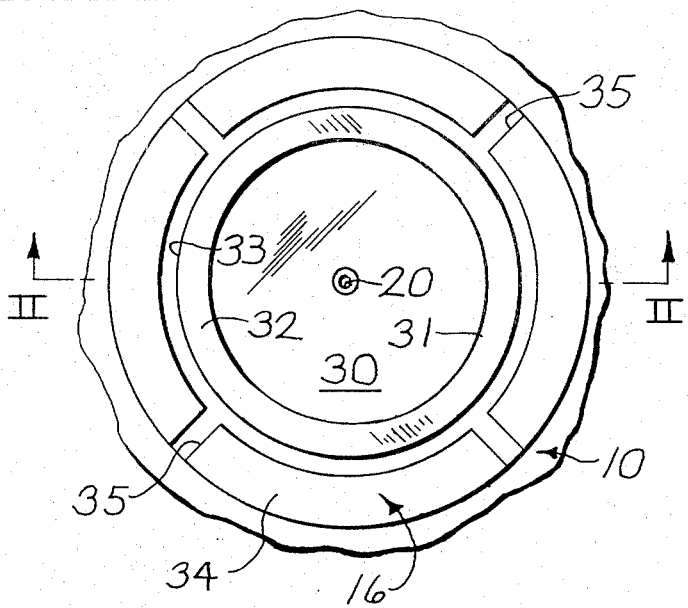
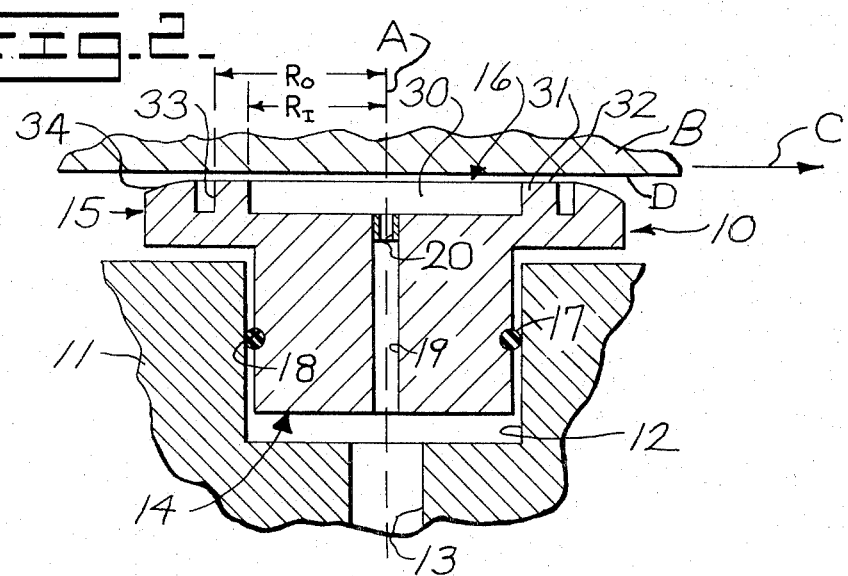

HYDROSTATIC BUTTON BEARING WITH ATTITUDE CONTROL

BACKGROUND OF THE INVENTION

Thrust loading on parts of machinery, such as hydraulic fluid translating units (pumps and motors) often vary in direct proportion to the hydraulic pressures developed in the unit. Further, as the thrust loading increases, distortion between relatively moving surfaces proportionately increases. For example, in axial piston type hydraulic fluid translating units, such as disclosed in U.S. Pat. No. 3,635,126, issued to Engel et al., and also assigned to the assignee of this invention, the loadings on its thrust plate are directly proportional to hydraulic pressures developed by the translating unit.

To resist these variable thrust forces, as pointed out in the above patent, hydrostatic button bearings having a skirt loosely fitting in pocket pressurized with the output pressure of the unit, provide the necessary resistance to the thrust loading, as well as compensate for distortion between a rotating thrust plate of the unit and its housing components.

However, the buttons, loosely mounted in such pressurized pockets, can rock, tilt or oscillate, thereby bringing the sharp edges of the surfaces milled in their bearing pad area into the engagement with the smooth runner face of the thrust plate against which they operate to resist the thrust loadings. Gouges or nicks in the runner face will cause the hydrostatic thrust bearing formed with such buttons to fail.

As a result, the individual button bearings must be constructed in a manner to avoid significant non-parallelism between their bearing pad area and the flat runner face if this particular type of thrust compensation is to be effectively employed.

In the above patent, the buttons employ several circular sills in the bearing pad area, the outer of which is slightly depressed (about two thousandths of an inch) to develop a wedge of oil at their leading edge to offset velocity induced shear forces of the thin oil film between runner face and bearing pad area, from forcing the leading edge up and the trailing edge down whereby the sharp edges of the sills will be more prominently exposed to the flat runner surface.

However, in practice, the stepped sill arrangement has not been entirely satisfactory as the tolerances are critical and difficult to hold.

Thus it is an object of this invention to provide a hydrostatic button bearing of the type described with a configuration for more positive attitude control and one that will eliminate gouges on the flat runner surface cooperating with a flat bearing pad area of such buttons.

SUMMARY OF THE INVENTION

An improved hydrostatic button bearing having a cylindrical skirt which is loosely received in a pressurized pocket so it can tilt about the cylindrical axis of the skirt and a bearing pad area oriented normal to the axis of the skirt includes a central circular recess having fluid communication with the pocket through a central orifice in the recess, a substantially flat circular inner sill boardering the circular recess and a spaced outer circular sill concentric therewith with its innermost edge disposed in the same plane as the flat surface of the inner circular sill, the outer circular sill having a chamfered circular periphery whereby improved attitude stability of the button is achieved under dynamic conditions. The width of the inner sill should be selected for a proper geometric balance.

BRIEF DESCRIPTION OF THE DRAWINGS

FIG. 1 is a plan of the bearing pad area of the improved hydrostatic button bearing, with a broken away portion of a structure having a pressurized pocket for supporting the button bearing; and FIG. 2 is a sectional view along lines II—II of FIG. 1 with a runner surface added above the bearing pad area of the button to show its relationship to a thrust surface.

DESCRIPTION OF AN EMBODIMENT

Reference is made to the aforementioned U.S. Pat. No. 3,635,126 issued to Engel et al. for a description of the environment in which the instant hydrostatic button is employed and the technical background causing the buttons to exhibit a tilting characteristic during operation of a device in which they are incorporated.

As can be seen in FIG. 2, the hydrostatic button 10 is supported from a cooperating structure 11 in a pocket 12 therein which is fed pressurized fluid through a connecting passage 13. Two principal parts form the button, a cylindrical skirt portion 14 and a bearing portion 15 which includes a flat bearing pad area 16 which is oriented normal to the cylindrical axis A of the skirt portion. Since the pocket is larger than the outer diameter of the skirt portion an O-ring seal 17 is disposed in a circular groove 18 in the central portion of the skirt, as shown, and prevents pressurized fluid from leaking from the pocket along the outer cylindrical surface of the skirt.

In operation the fluid pressure in the pocket drives the button axially along axis A toward a smooth runner surface D that moves in the direction of arrow C. Pressurized fluid is bled through passage 19 and orifice 20 to the bearing pad area 16 of the button where it is bled across the surfaces of the sills in a manner that the pressure gradients developed will cause a thin oil film to be maintained between the bearing pad area and the adjacent runner surface D. Thus a hydrostatic bearing capable of resisting thrust loading on the runner surface tending to move it toward the pocket 12, as illustrated in FIG. 2.

By constructing the bearing pad area 16 as herein described, it is possible to maintain the advantages of the described hydrostatic bearing, while increasing the attitude stability of the button which is free to wobble or oscillate about axis A. This is accomplished by providing a large central circular recess 30, exceeding one half of the bearing pad area, which is fed pressurized hydraulic fluid through orifice 20 and is encircled by a continuous inner sill 31 having a flat top surface 32. An annular groove 33 separates this inner sill from a concentric outer sill 34, which include a plurality of bleed notches 35 to drain hydraulic fluid from the groove. The innermost circular edge of the outer sill is matched to the height of the top flat surface of the inner sill and outer circular edge of the outer sill and is chamfered to eliminate a sharp peripheral edge on the outer sill. This arrangement prevents any sharp peripheral edges from being prominently exposed to the runner surface D thereby eliminating gouging thereof. Because the outermost edge of the outer sill is chamfered, it cannot gouge this surface and the outer edge of the inner sill cannot be exposed to this surface. Preferably the chamfer is spherical as shown in FIG. 2 for the most preferred embodiment.

While the degree of chamfer of the outer edge of the outer sill is not critical, the width of the inner sill is critical. To provide the necessary geometric balance when using a chamfered edge, the relationship of the radii, the inner edge $R_I$ and the outer edge $R_O$ of the inner sill must be with certain limits, if the button is to function properly as a hydrostatic bearing with the necessary attitude control. The below formula establishes the relationship and the percent of geometric balance should be at least 99 percent:

$$\text{Geometric Balance (\%)} = 200\ (R_O^2 - R_I^2)/\log_e (R_O/R_I)\ B^2$$

where B is the diameter of orifice 20.

With a spherical or tapered outer peripheral edge on the outer sill and the runner surface D moving in the direction of arrow C, hydrodynamic pressure will build up a gradient (wedge of oil) at the leading edge which will offset the velocity induced shear forces tending to tilt the leading edge of the button toward the runner surface D. These offsetting forces will substantially balance one another over a wide velocity range when the percent of geometric balance is at least 99 percent, or higher. Preferably the percentage will be between 100 percent and 120 percent.

What is claimed is:

1. An improved hydrostatic button bearing having a cylindrical skirt portion adapted to be loosely received in a pressurized pocket with a seal so it can oscillate about the cylindrical axis of the skirt without loss of pressurized fluid from the pocket and a hydrostatic bearing pad area portion oriented normal to the cylindrical axis of the skirt wherein the bearing pad portion comprises:

a central circular recess having a passage means connecting it through said skirt portion for communication with pressurized fluid in an associated pressurized pocket in which said skirt portion is inserted;

an inner circular sill having a substantially flat circular surface bordering such recess, the width of said flat circular surface being defined by the equation $$200\ (R_O^2 - R_I^2)/\log_e (R_O/R_I)\ B^2 > 99\ \text{percent}$$

wherein $R_O$ and $R_I$ are respectively the radii to the outer circular edge and inner circular edge of said flat circular surface and B is the minimum diameter of said passage means; and a spaced outer circular sill concentric with said inner circular sill, said spaced outer sill having an innermost circular portion level with said flat circular surface of said inner sill whereby said button will be self-stabilizing during operation in hydrostatic bearing application.

2. The improved hydrostatic button bearing defined in claim 1 wherein the passage means includes an orifice and B is the diameter of the orifice.

3. The improved hydrostatic button bearing defined in claim 1 wherein the outer circular edge of the outer sill is chamfered.

4. The improved hydrostatic button bearing as described in claim 3 wherein the chamfered outer edge is spherical.

* * * * *

UNITED STATES PATENT OFFICE
CERTIFICATE OF CORRECTION

Patent No. 3,799,628　　　　Dated March 26, 1974

Inventor(s) Peter H. Van Gaasbeek et al

It is certified that error appears in the above-identified patent and that said Letters Patent are hereby corrected as shown below:

In column 3, line 20, delete "orifice 20" and insert therefor --pocket 12--.

Column 4, line 20, delete "passage means" and insert therefor --pocket--.

Column 4, line 29, delete "orifice" and insert therefor --pocket--.

Figure 2 should show that "B" is the diameter of pocket 12 as shown below:

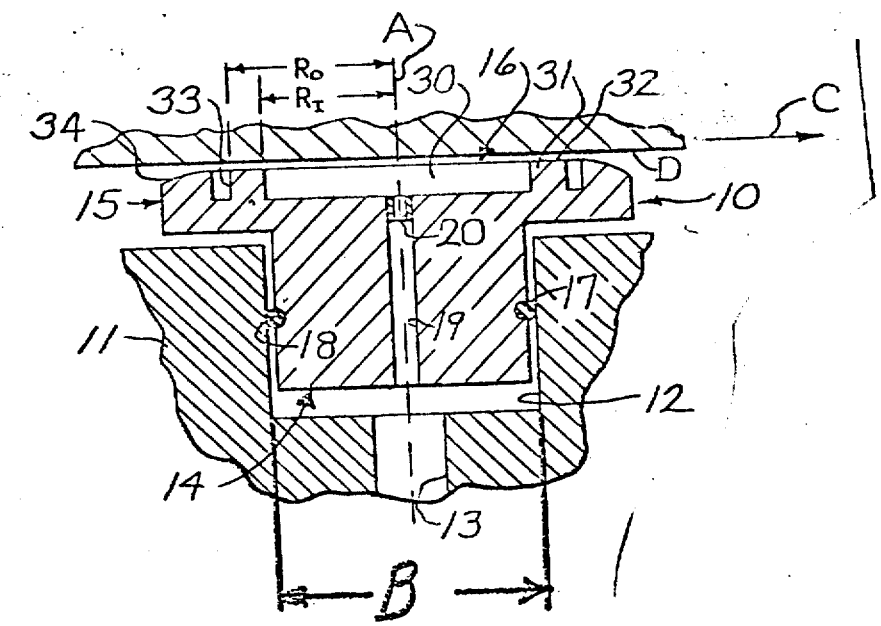

Signed and sealed this 22nd day of October 1974.

(SEAL)
Attest:

McCOY M. GIBSON JR.　　　　　　　　　　C. MARSHALL DANN
Attesting Officer　　　　　　　　　　　　Commissioner of Patents